INVENTOR.
JAMES T. BLAKISTONE
BY Lyon & Lyon
ATTORNEYS

Nov. 16, 1965 J. T. BLAKISTONE 3,217,993

CONTROL SYSTEM FOR RECORDING APPARATUS

Filed March 1, 1957

3 Sheets-Sheet 2

INVENTOR.
JAMES T. BLAKISTONE

BY Lyon & Lyon

ATTORNEYS

CONTROL SYSTEM FOR RECORDING APPARATUS

Filed March 1, 1957 3 Sheets-Sheet 3

INVENTOR.
JAMES T. BLAKISTONE
BY Lyon & Lyon
ATTORNEYS

United States Patent Office 3,217,993
Patented Nov. 16, 1965

3,217,993

CONTROL SYSTEM FOR RECORDING APPARATUS

James T. Blakistone, 700 E. Huntington Drive, Alhambra, Calif.

Filed Mar. 1, 1957, Ser. No. 643,400
9 Claims. (Cl. 242—55.12)

The present invention relates to improved means and techniques useful in the control of recording means, and the present application is directed to improvements in the type of system described and claimed in my copending patent application Serial No. 421,012, now U.S. Letters Patent No. 2,930,855 issued March 29, 1960.

The arrangement described herein contemplates use of recording medium with, for example, a magnetizable wire or a magnetizable tape on which intelligence is recorded and then played back or reproduced.

Apparatus of this character is capable of producing generally five functions, namely, a recording function, a play-back or reproducing function, an erasing function accomplished either by itself or simultaneously as a part of the recording function, a rewind or back spacing function, and a fast forward function. Each of these five functions is easily selectable and controlled in accordance with important features of the present invention, using for that purpose only a single control element which is conveniently mounted on an associated combination microphone and speaker for convenient access and operation.

By these control means, the apparatus described herein is admirably suited for dictation purposes in that it allows convenient editing of prerecorded material and correction of the same.

The control apparatus described herein is intended to accomplish generally the same purposes as the control apparatus described in my above mentioned copending application.

An object of the present invention is therefore to provide an improved control system for apparatus of this character.

A specific object of the present invention is to provide an improved recorder characterized by its simplicity in that no mechanical braking means is required, the braking or drag which is required in proper reeling and unreeling of the tape being provided electrically by applying a controlled amount of direct current to alternating current motors which are used in reeling the tape.

Another specific object of the present invention is to provide a dictation system of this character incorporating means that may be conditioned to produce an audible signal in the microphone when the apparatus is in its playback or reproducing function so that the user is warned that the material which he is dictating is not being recorded.

Another specific object of the present invention is to provide a novel control system of this character which incorporates a fast forward function which is initiated by a single switch carried on the microphone and operable also to select the rewind, playback and recording functions.

Another specific object of the present invention is to provide a control system of this character in which all of the five functions mentioned above may be selected and controlled by a single switch carried on the microphone.

Another specific object of the present invention is to provide an improved recorder which may be used either in a high-fidelity sound reproducing system or for dictation and transcription purposes.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 represents in diagrammatical form a top plan view of recording apparatus embodying features of the present invention.

FIGURE 2 comprises FIGURES 2A, 2B and 2C with identically designated terminals in the octal connectors and identically designated terminals in the Jones plugs interconnected.

FIGURES 3 indicates in diagrammatical form the manner in which a counter is connected to the rewind motor shown in FIGURE 1.

Figures 1, 2B, 3:
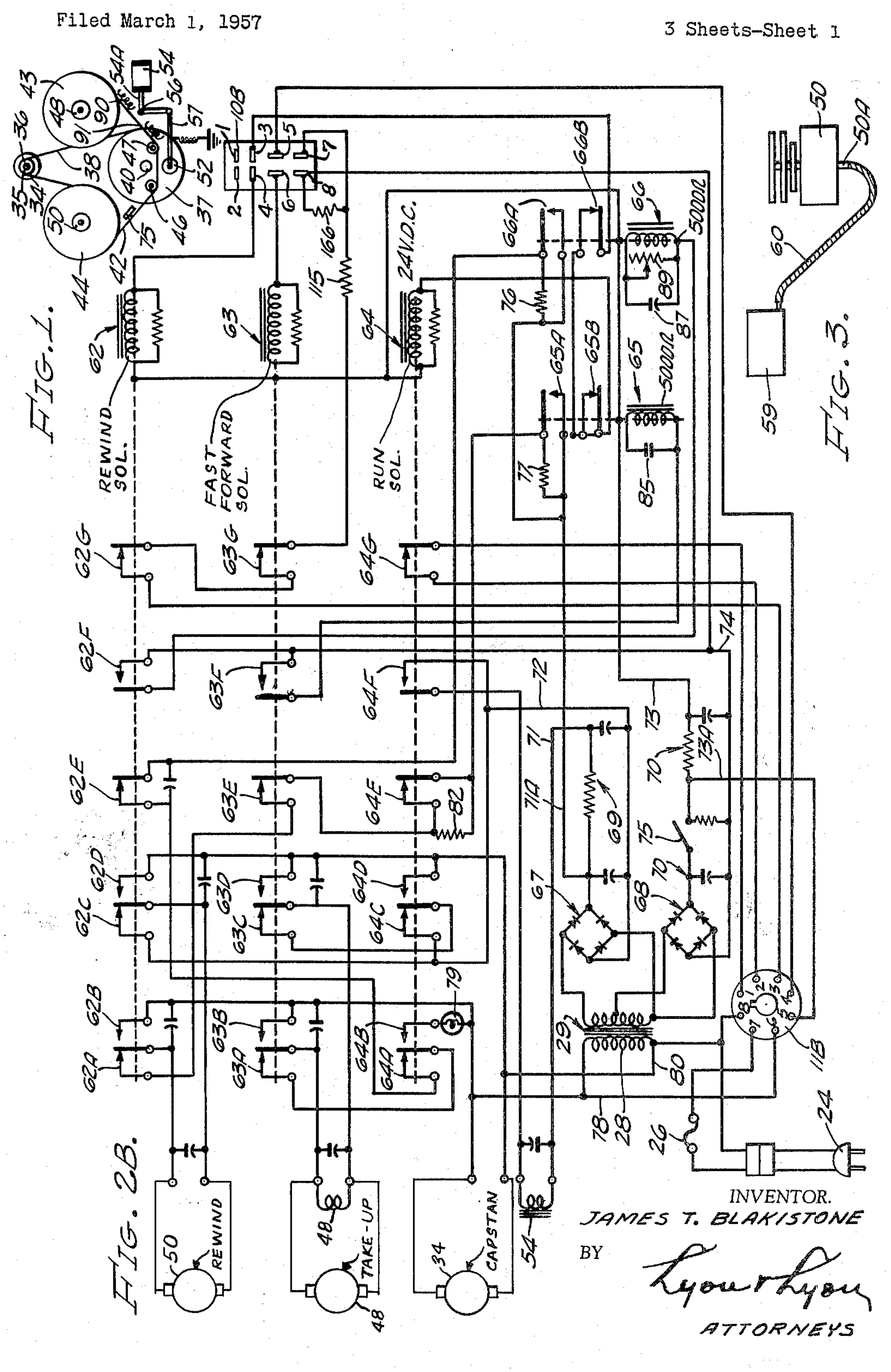
FIGURE 3A shows the stenographer's control circuit.
Figures 2A, 2C, 3A, 3B, 4, 5:
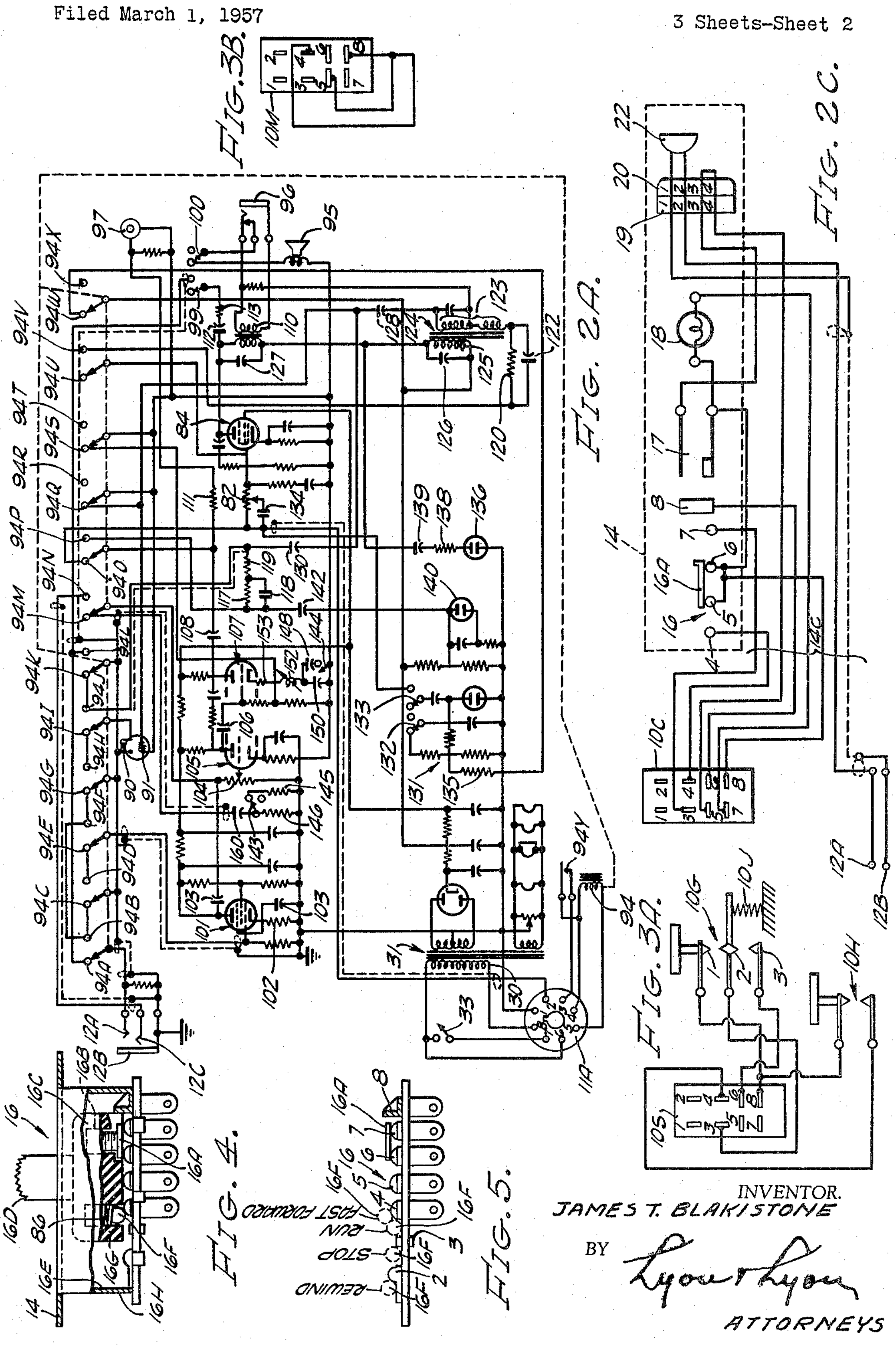
FIGURES 4 and 5 show details of one control switch.

FIGURE 2A illustrates the apparatus mounted on one chassis of the recorder, such chassis being designated as the amplifier chassis, and such chassis mounts a complete circuitry through which sound signals are developed, transferred and controlled, as well as the power supply for powering the various tubes on such chassis; whereas FIGURE 2B illustrates the components mounted on a second set of chassis, such components being essentially the various driving motors, control system including relays and power supplies. It is understood that the identically numbered terminals on the Jones socket 10B in FIGURE 2B are connected to the identically numbered terminals on the Jones plug 10C in FIGURE 2C, and that the identically numbered terminals in the octal socket 11B in FIGURE 2B are connected to the identically numbered terminals in the octal plug 11A in FIGURE 2A. Further, it is understood that the terminals 12A and 12B in FIGURE 2C are connected to corresponding terminals 12A and 12B in FIGURE 2A when the apparatus is conditioned for recording purposes. The terminals 12A and 12B in FIGURE 2C are terminals of a three-way microphone plug and the terminals 12A and 12B in FIGURE 2A are terminals of a three-way jack. The other terminal 12C of the microphone input jack in FIGURE 2A is used when it is desired to reproduce the output of a stronger signal such as, for example, the output of a so-called F.M. tuner as used in high-fidelity equipment.

With reference to FIGURE 2C, it is noted that the microphone control shown therein comprises a housing represented by the dotted rectangle 14, and such housing 14 serves as a mounting for the special control switch 16, the so-called record switch 17 and indicating lamp 18 and a Jones socket connector 19 for receiving the cooperating plug 20 to which mounts and connects the microphone element 22. An elongated multi-conductor cable extends from such housing 14, and the individual conductors of such cable is connected, as shown, to the terminals of the Jones plug 10C and by a separate cable from the Jones plug 19 to terminals 12A, 12B of the microphone plug. Both switches 16 and 17 are mounted close together so that they both may be conveniently thumb-operated by the user by the same hand which he uses to hold the microphone 22 close to his lips.

All of the switches are illustrated in their normal conditions, i.e., the positions which they assume when the source of power is disconnected from the apparatus and the mircrophone control switch is in the "stop" condition.

Power is supplied to the apparatus through a conventional wall plug 24 (FIGURE 2B), the opposite terminals of which are connected through fuse 26 to terminals 7 and 8 of the octal socket 11B. Terminal 8 is connected to one terminal of the primary winding 28 of the transformer 29 and also to one terminal of the primary winding 30 (FIGURE 2A) of transformer 31. Terminal 7 is connected to one terminal of the on-off switch 33, the other terminal of such switch 33 being connected to the other terminal of windings 28 and 30, so that when switch 33 is closed both transformers 29 and 31 are energized to provide power for the relays shown in FIGURE 2B and for the various tubes shown in FIGURE 2A. It is noted that the A.C. driving motor 34 in FIGURE 2B is connected across the terminals of primary winding 28, so that the driving motor 34 rotates continuously as long as switch 33 remains closed. This driving motor 34 is illustrated also in FIGURE 1 and has a pulley 35 mounted on its shaft 36 to drive a flywheel 37 through the belt 38. A capstan 40 is mounted on the flywheel 37 and may be mechanically coupled by means of pressure roller 52 with the magnetizable tape 42, a portion of which is wound on the take-up reel 43 and a portion of which is wound on the rewind reel 44. The tape 42 passes around guides 46 and 47 on opposite sides of the rotating capstan 40. The rewind reel 44 is coaxially arranged and connected to the shaft of the rewind motor 50; and, similarly, the take-up reel 43 is coaxially arranged and connected to the shaft of the run or take-up motor 48. The system is thus a three-motor system in that it involves the three motors 34, 48 and 50.

During the playback and recording functions, the pressure roller 52 serves to press the tape 42 into frictional engagement with the capstan 40 to establish a driving connection between the capstan 40 and the tape 42. In order to establish such driving connection, it is required that the pressure roller solenoid 54 be energized. The movable core 54A of the solenoid 54 is pin connected at 56 to one end of the bell crank 57 which is fulcrumed at 58 and which rotatably supports the pressure roller 52 on its other end. During the rewind and fast forward functions, as described in detail later, the solenoid 54 is not energized, the solenoid 54 being energized only during the playback and record functions.

Preferably, as shown in FIGURE 3, a conventional digital counter 59 is connected through a flexible cable 60 to an outwardly extending shaft 50A of the rewind motor 50 for purposes of identifying, in an arbitrary manner, location of specfic portions of the recording.

Thus, as outlined above, the drive motor 34 and capstan 40 driven thereby continuously rotate, and the circuitry by which the motors 48 and 50, as well as the pressure roller solenoid 54, are controlled is now described.

One of the important features of the present invention is that no mechanical brakes for stopping the tape or for imposing a drag on the tape is required, such braking and drag being produced by applying controlled amounts of direct current to the take-up motor 48 and rewind motor 50, both of which are essentially split-phase alternating current induction motors of the shaded poletype.

The motor control system involves five relays, namely, the so-called rewind relay 62, a fast forward relay 63, a run relay 64 and two time-delay relays 65 and 66. For convenience of reference, the various relay switches operated upon energization of a corresponding relay winding have the same reference numeral, but with a distinguishing letter appended thereto. Thus, for example, when relay winding 62 is energized, the associated relay switches 62A, 62B, 62C, 62D, 62E, 62F and 62G are actuated. Similarly, when the relay winding 63 is energized, the associated relay switches 63A, 63B, 63C, 63D, 63E, 63F and 63G are actuated.

As indicated previously, these relay, switches are all in their normal position they assume when no energizing voltages are applied to their associated coils or windings. It will be readily understood that each relay incorporates conventional means (which, per se, forms no part of the present invention) for causing the relay switches thereof to assume or to be restored to such normal positions after its associated coil is energized and then deenergized.

The power transformer 29 in FIGURE 2B is continuously energized and its secondary is connected to the two full wave rectifiers 67 and 68 which are associated respectively with filters 69 and 70 to produce, on the one hand, a direct current voltage of 35 volts between leads 71 and 72, and, on the other hand, 24 volts D.C. between leads 73 and 74. For this purpose, the switch 75 in the filter circuit 70 is normally closed. The switch 75 is shown also in FIGURE 1 and is maintained in a closed position by engagement of the tape 42 with the actuating member of switch 75. When there is no tape extending between the reels 43 and 44, the switch 75 is allowed to open and then, of course, there is no voltage across the leads 73 and 74.

The pressure roller solenoid 54 has one of its terminals connected to lead 71, the other terminal of solenoid 54 being connected to lead 72 through the normally open relay switch 64F. This means that the pressure roller solenoid 54 is energized only when the run relay 64 is energized, i.e., when a recording is being reproduced or when a recording is being made. The lead 72 is connectable to one terminal of the take-up motor 48 through a path which extends from lead 72, through the normally closed relay switch 64C and through the relay switch 63C, the other terminal of motor 48 being connectable to the opposite lead 71A of the power supply through the following circuit: such other terminal of motor 48, normally closed switch 63A, normally closed relay switch 64A, normally closed relay switch 62E, and voltage dropping resistance 76, which has a value of 150 ohms.

This resistance 76 is short-circuited upon closure of the normally open relay switch 66A, as described later. Thus, normally, i.e., in the stop position of switch 16, as shown in FIGURE 2C, a small amount of direct current flows through the take-up motor 48, such current being limited by the resistance 76. By such means, the shaft of motor 48 and the reel 43 is effectively locked in position.

Under the same circumstances, a small amount of direct current flows through the rewind motor 50 to effectively lock the associated rewind reel 44 in position and the direct current, for that purpose, flows through the following described circuitry. One terminal of motor 50 is connected to lead 72 through the following path, namely, one terminal of motor 50, normally closed relay switch 62C, the other terminal of motor 50 being connectable to the lead 71A through the following path, namely, such other terminal of motor 50, normally closed relay switch 62A, normally closed relay switch 63E, normally closed relay switch 64E and resistance 77 of 100 ohms, such resistance 77 being short-circuited upon closure of the relay switch 65A, as described later. Thus, normally in the stop position of switch 16 (FIGURE 2C) as shown, a small amount of direct current flows through the motor 50, as established by the value of resistance 77.

The amount of direct current thus normally applied to the motors 48 and 50 is of relatively small intensity while accomplishing its purposes, and such current does not cause overheating of the motors 48 and 50, which are made small and compact to satisfy space requirements. When, however, either one of the switches 65A or 66A is closed to produce a short-circuiting of the corresponding current limiting systems 77 or 76, as the case may be under the conditions described later, a relatively high current flows to produce a high braking force on the corresponding motor. Such high current flow, if allowed to continue, would seriously overheat the corresponding motor, but the time interval during which these switches 65A and 66A are allowed to be closed during rewind and fast forward operation is relatively of short duration, i.e., the order of one or two seconds, as described later in connection with the rewind and fast forward operations. The relatively small amount of D.C. current which is normally allowed to flow through the motors 48 and 50 when the machine is in its stop condition provides sufficient stabilizing force to secure tape reel movement during tape loading and also when the tape is at rest to prevent spilling of the tape from the reels.

When the apparatus is conditioned to transport the tape 42 from the rewind or supply reel to the take-up reel during the playback function or recording function, the multi-position switch 16 is in its run position wherein its manually operated slidable contact bar 16A then bridges contacts 6 and 7 of the switch 16. In such case, the run relay 64 is energized, and the energizing circuit for such run relay 64 is now described. Such circuit extends from one terminal of the relay winding 64 through the normally closed relay switches 65B, 66B, contacts 3 of the Jones connectors 10B, 10C, through the bridged stationary contacts 6, 7 of switch 16, through the contacts 8 of the Jones connectors 10B, 10C and lead 74 of the 24 volt D.C. power supply, the other lead 73 of such power supply being connected to the other terminal of relay winding 64. Thus, under this condition, winding 64 is energized and the associated relay switches 64A–64C are actuated.

In general, the relay switches 64A, 64B, 64C and 64D, considered collectively, constitute a double-pole, double-throw transfer switch for transferring direct current to alternating current to the take-up motor 48. In other words, when switches 64A and 64C are open, the previously described D.C. energizing circuit for motor 48 is interrupted. However, when switches 64B and 64D are closed, the motor 48 is energized with alternating current exclusively through the following described energizing circuit. Such energizing circuit extends from the A.C. lead 78, through the voltage dropping lamp 79, switch 64B and switch 63A to one terminal of motor 48, the other terminal of motor 48 being connected to the other A.C. lead 80 through the switch 63C and switch 64D. Also at this time, the switch 64E is opened to open the short-circuit across resistance 82 of 150 ohms for purposes of decreasing the D.C. drag current through the rewind motor 50. In such case, such drag current is limited not only by the resistance 77, as previously described, but also by this resistance 82. Further, under this condition, switch 64F is closed to energize the pressure roller solenoid 54 to thereby provide a frictional driving connection between the capstan 40 (FIGURE 1) and the tape 42. Also at this time, switch 64G is opened for purposes of muting the audio amplifier in FIGURE 2A, it being noted that one terminal of switch 64G is connected through contacts 2 of connectors 11B, 11A and through the tone control resistance 83 to the control grid of the audio output tube 84, with the other terminal of switch 64G being connected through contacts 1 of connectors 11B, 11A to ground.

Thus, summarizing, when switch 16 is in its run position the take-up motor 48 is energized exclusively with alternating current, a lesser amount of D.C. drag current flows through the rewind motor 50, the pressure roller solenoid 54 is energized to provide a driving connection between the capstan 40 (FIGURE 1) and the tape 42 and muting of the last stage of the audio amplifier, namely, stage 84 (FIGURE 2A), is removed, and the tape is transported at a relatively slow speed from the rewind reel 44 to the take-up reel 43 for purposes either of reproducing a prerecording or for recording. The sound reproducing and recording circuits are described later.

When the manually operated switch 16 has its slidable contact bar 16A moved to its fast forward position, such contact bar 16A bridges contacts 6, 7 and 8 of switch 16 to energize the fast forward relay 63 through an energizing circuit now described.

The fast forward relay 63 has one of its terminals connected to the D.C. power supply lead 73, the other lead 74 of such power supply being connected to the other terminal of relay winding 63 through contacts 8 of connectors 10B, 10C, through the shorting bar 16A, through stationary contact 8 of switch 16, through contacts 6 of connectors 10C, 10B and such other terminal of the fast forward relay winding 63. Consequently, the associated relay switches 63A–63G are actuated. The switches 63A, 63B, 63C and 63D, considered collectively, constitute a double-pole, double-throw transfer switch for interrupting the flow of direct current to the take-up motor 48 and, instead, to energize such motor 48 with alternating current. Such alternating current energizing circuit for motor 48 extends from one terminal of motor 48 through switch 63B and the power input lead 78, the other power input lead 80 being connected to the other terminal of motor 48 through switch 63D, with the result that motor 48 is energized exclusively with alternating current. At this time also, switch 63E is opened to thereby interrupt the flow of D.C. current to the rewind motor 50 to thereby remove the electro-magnetic drag which is otherwise developed in motor 50. Also at this time, switch 63F is closed to complete an energizing circuit for the relay 65 which has its switches 65A, 65B actuated instantaneously upon energization, but which has a time delay on dropout, i.e., the switches 65A, 65B return to their normal positions after deenergization of the winding 65 after a time delay established by the resistance of the relay winding 65 and the condenser 85 connected in parallel with such relay winding. Further, at this time switch 63G is opened to interrupt a holding circuit for accomplishing a record function, assuming that such holding circuit had been previously established as described hereinafter. The condenser 85 has a capacity of 75 microfarads and the resistance of the winding 65 is 5,000 ohms.

When winding 65 is energized upon closure of the aforementioned relay switch 63F, switch 65A is closed and switch 65B is opened. Closure of switch 65A results in short-circuiting of resistance 77 without any result at this particular time since, as mentioned above, switch 63E is opened at this instant. Opening of switch 65B prevents the run relay winding 64 from being energized at this instant even though the shorting bar 16A (FIGURE 2C) bridges switch contacts 6 and 7. Thus, as long as the shorting bar 16A is manually held in engagement with the fast forward contact 8 of switch 16 against the action of the restoring spring 86, the take-up motor 48 and the take-up reel 43 (FIGURE 1) are rotated without any electromagnetic drag in motor 50 and without the pressure roller 52 contacting the tape 42 (since switch 64F is now open). Consequently, the tape is transported at a much higher speed from the rewind reel 44 to the take-up reel 43 during the fast forward function. Immediately upon manual release of the shorting bar 16A, the spring 86 moves the shorting bar 16A away from the contact 8 and into the run position wherein such shorting bar 16A bridges stationary contacts 6 and 7 of switch 16. When this is accomplished, the relay 65 does not drop out instantaneously but does drop out automatically after a time delay of one or a few seconds established by the time constant of the circuit 65, 85. During this delay interval the fast forward relay is deenergized since shorting bar 16A no longer contacts the stationary contact 8, and the motor 48 is now energized with direct current exclusively through switches 63A, 64A, 63C, 64C, 62E, resistance 76, with the result that the normal D.C. stabilizing voltage is applied to the rewind motor 48 to obtain a medium amount of electromagnetic braking. However, the rewind motor 50 of substantially identical construction as the take-up motor 48 is electromagnetically braked to a stronger degree than the take-up motor due to shorting out the resistance 77 while relay 55 is being held closed by the discharge of condenser 75, thus allowing the full voltage of the power supply to be impressed across the terminals of motor 50. Thus, there is differential braking in going from the fast forward function to either the run or stop functions so as to obtain quicker stops with less strain on the tape and to prevent spilling of the tape while the take-up reel 43 is being slowed down to a standstill. The time relay imposed by the circuit 65, 85 is sufficiently prolonged to allow such standstill condition to be achieved. After such time interval (and assumming that the switch 16A is in its run position, i.e., stationary contacts 6 and 7 of switch 16 are bridged), the run function is automatically instituted upon return of the switches 65A and 65B to their positions shown in FIGURE 2B. Thus when switch 65B is allowed to close, the run relay winding 64 is automatically energized to operate the switches 64A–64G and produce the results previously described; and further, opening of switch 65A opens the previously existing short-circuit across resistance 77 and the electromagnetic drag developed in the rewind motor 50 is determined by the magnitude of the serially connected resistances 77 and 82.

When the manually operated shorting bar 16A is moved to the rewind position, stationary contacts 4 and 5 of switch 16 are bridged, with the result that the rewind relay 62 is energized through the circuit which extends from the D.C. source lead 73, through the relay winding 62, through contacts 4 of connectors 10B, 10C, through the short-circuiting bar 16A, through the contacts 8 of switches 10B, 10C and the other lead 74 of the D.C. source.

It is understood that detent means are used to maintain the shorting bar 16A in either one of the three selected positions of rewind, stop and run, but such shorting bar 16A is biased away from the fast forward position, i.e., from the fast forward contact 8, as described later. These detent means are such that it is relatively easy to move the shorting bar 16A from the stop position to the run position and vice versa, but a greater amount of resistance is encountered both in moving the shorting bar 16A from the stop position to the rewind position and from run position to fast forward position thereby allowing the operator to sense the position of the shorting bar 16A by feel.

When the rewind relay 62 is energized, as previously described, the associated group of relay switches 62A–62G are actuated. The switches 62A, 62B, 62C and 62D, considered collectively, constitute a doube-pole, double-throw transfer switch for changing the energization of motor 50 from direct current to alternating current. Thus when switches 62A and 62C are opened, the direct current circuit for motor 50 is interrupted and when switches 62B and 62D are closed, the motor 50 is energized exclusively with alternating current obtained from the leads 78 and 80. Opening of switch 62E at this time interrupts the flow of D.C. current to the take-up motor 48 so that no electromagnetic drag is developed in motor 48. Opening of switch 62G opens a record holding circuit (assuming that the same has been previously closed), as described hereinafter. Closing of relay switch 62F results in energizing the relay 66 which is actuated instantaneously but which drops out after a time delay established by the time constant of the circuit involving the shunt connected condenser 87, adjustable resistance 89 and resistance of the relay winding 66 which is 5,000 ohms. The adjustable resistance 89 has a total magnitude of 25,000 ohms. Thus at this instant when relay 66 is energized, relay switch 66A is closed and relay switch 66B is opened. Closure of switch 66A does not produce a result at this particular time since switch 62E is opened. Opening of the switch 66B prevents energization of the run relay 64. Under these conditions, the tape is rewound from the take-up reel 43 onto the rewind reel 44 at a relatively high speed since there is no electromagnetic braking developed in the motor 48 and since the pressure roller 52 (FIGURE 1) is withdrawn from tape driving engagement and the full A.C. voltage is applied to rewind motor 50. This rapid rate of tape movement continues until the shorting bar 16A is moved out of the rewind position, at which time the rewind relay 62 is de-energized but the delay relay 66 remains energized for a time interval during which the reels are decelerated to a standstill condition, as previously described in connection with time delay relay 65.

More specifically, when relay winding 62 is de-energized, relay switches 62A–62G return to their positions shown in FIGURE 2B, in which case the flow of alternating current is interrupted and a flow for direct current is established by switches 62A and 62C; a D.C. energizing circuit for take-up motor 48 is established by switch 62E and the opening of switch 62F results in breaking the energizing circuit for relay 66. However, as mentioned previously, relay 66 remains in its actuated condition for a time interval established by adjustment of resistance 89. During this time interval, the run relay 64 is prevented from being energized even though the shorting switch 16A may have been moved to its run position wherein stationary contacts 6 and 7 are bridged. Switch 66A remains closed during this time interval to short-circuit resistance 76 so that the full voltage developed across the D.C. leads 72 is applied to the take-up motor 48 to electromagnetically brake the same to a greater degree than is the rewind motor 50, the braking of the rewind motor at this instant is determined by the magnitude of resistance 77 which is 100 ohms. By thus differentially braking the take-up motor a greater degree than the rewind motor 50, spilling of the tape is prevented, tape forces reduced and the system comes to rest more quickly. Such differential braking continues during this time interval during which the reels 43 and 44 are decelerated at a relatively high rate to a standstill condition; and if at the end of this time interval the contact bar 16A is in the run position, the run function is automatically instituted upon closure of switch 66B which establishes an energizing circuit for the run relay 64 and operation of switches and the production of results described above in connection with the run function.

As outlined above, when the "run" function is instituted the take-up motor 48 is energized from the A.C. leads 78 and 80 through the incandescent lamp 79. The provision of such lamp 79 for this purpose is considered of importance in that the resistance of the lamp 79 in its cold condition is one-tenth less than its resistance when hot. This means that a relatively large alternating current voltage is initially applied to the take-up motor 48 for quick acceleration and that such applied voltage is decreased automatically when and as the incandescent lamp 79 heats. This expedient besides providing quick acceleration of the take-up motor, allows also the use of a smaller take-up motor which is not unduly heated after a prolonged period of continuous energization.

Now that the construction and function of the tape transport mechanism has been described above, the manner in which the audio signals are developed, recorded and erased are now described particularly with respect to FIGURE 2A.

Two conventional coils or heads 90, 91 are magnetically associated with the tape 42 in conventional manner. The coil 90 is a so-called erase coil to which a relatively large amplitude high-frequency signal of, for example, 55 kilocycles, is applied for erase purposes. The coil 90 functions either as a playback coil or a recording coil, depending upon the selected condition of the apparatus; and when such coil 90 is conditioned for recording, a relatively small amplitude high frequency current of, for example, 55 kilocycles is simultaneously applied with currents of audio frequency to enhance the recording quality as is well understood in the art.

The apparatus is conditioned for recording or for listening (playback), depending upon the energized condition of the record-listen solenoid 94. Normally, the apparatus is conditioned for the listen function, i.e., with no power applied to the solenoid 94, the associated switches 94A–94Y are in their listen positions illustrated in FIGURE 2A. Further, as will be more clear later, should there be a power failure while the recorder is in a record function, the switches will, of course, assume their listen positions and means are provided whereby such switches remain in their listen positions after power is again applied. This feature is considered of importance in that it minimizes the possibility of losing a recording after reapplication of power to the apparatus.

Assuming that the switches 94A–94Y are in their listen positions, as illustrated, and the manually operated switch 16A (FIGURE 2C) is in its run position, the prerecorded material on the tape is reproduced, either by the speaker 95, by a speaker (not shown) connected in conventional manner to the output jack 96, or reproduced after amplification in an auxiliary amplifier (not shown) having its input connected to the jack 97. The operation is first described in connection with sound reproduction by the speaker 95 with the manually operated switches 99 and 100 in their positions illustrated in FIGURE 2A.

The audio signals induced in the pick-up head 90 are applied between the control grid and cathode of the first amplifying tube 101, it being noted that one terminal of the pick-up coil 90 is grounded and the other terminal of coil 90 is connected to such control grid through switches 94I and 94E. The cathode of tube 101 is returned to ground through the conventional bias resistance 102 which is shunted by condenser 103. The amplified signals appearing on the anode of tube 101 are coupled via condenser 103 and the volume control resistance 104 to the next amplifying tube 105. The amplified voltage appearing on the anode of tube 105 is coupled via condenser 106 to the control grid of the next amplifying tube 107. The amplified voltage on the anode of tube 107 is coupled via condenser 108 and switch 94O and tone control resistance 82 to the control grid of the audio power amplifier tube 84 (which may be converted, as described later, as an oscillator during the record function), and the amplified voltage appearing on the anode of tube 84 is applied to the primary winding of output transformer 110. One terminal of the secondary winding of transformer 110 is connected directly to one terminal of speaker 95, the other terminal of speaker 95 being connected to the other terminal of such secondary winding through switch 100 and external speaker jack 96. Thus, under these stated conditions, the prerecorded sound is reproduced on speaker 95 so long as the switch 16A is in its run position; and the reproduction may be stopped and continued by moving the switch 16A from its stop position to its run position, or vice versa. When an external speaker is plugged into jack 96, the sound is reproduced on such external speaker and sound no longer emanates from speaker 95.

Means are provided for obtaining sound reproduction with greater fidelity in an external amplifier speaker system coupled to jack 97, which external amplifier has better sound reproducing qualities than the output transformer 110, the size of which is dictated largely by space requirements in a compact recorder. For high-fidelity reproduction, one terminal of jack 97 is grounded and the other terminal of jack 97 is coupled via resistance 111 and condenser 108 to the anode of the amplifying tube 107.

In those instances where it is desired to record from a high level input such as, for example, from the output of an F.M. tuner, the output of the tuner is applied to the jack terminals 12C, 12B, and the record-listen solenoid 94 is energized to actuate the switches 94A–94Y so that a recording may be made of the output of the F.M. tuner while it is being simultaneously reproduced through an external amplifier-speaker system connected in parallel with jack terminals 12B, 12C. In such case a portion of the output signal from the F.M. tuner applied to the jack contact 12C is applied via switch 94N to one terminal of the volume control resistance 104 having its adjustable tap connected to the control grid of tube 105; and such signal after amplification in tubes 105 and 107 is applied via condenser 108 and resistance 111 to the ungrounded terminal of jack 97.

Further, the arrangement may be conditioned so that the prerecorded material may be reproduced in the microphone 92, which at this time serves as a speaker. This feature is particularly desirable for dictation purposes or wherever the relatively high level of the speaker playback might disturb others. For this purpose, the switches 99 and 100 are actuated to their other positions, in which case the speaker 95 and jack 96 are rendered ineffective and the output of the tube 84 is applied to the microphone 92 through the following described circuit, namely, the circuit extending from the anode of tube 84, through condenser 112, resistance 113, switch 99, switch 94A, jack contact 12A, one terminal of the microphone 22, the other terminal of microphone 22 being grounded via contact 12B.

During reproduction of prerecorded material, the erase head 91, of course, is rendered ineffective since the same is short-circuited by switch 94Q and, further, since at this time no erase bias is being developed.

The apparatus is conditioned for recording by energizing the record-listen solenoid 94. Solenoid 94 is energized by closing the momentary type of switch 17 which is normally biased to its opened position shown in FIGURE 2C. Upon closing of the switch 17, a current flows through solenoid 94 through a path which extends from the D.C. source lead 73A (FIGURE 2B) through contacts 5 of connectors 11B, 11A, through solenoid 94, through contacts 4 of connectors 11A, 11B, through contacts 5 of connectors 10B, 10C, through contacts 4 and 3 of connectors 19 and 20, through record switch 17, through contacts 8 of connectors 10C, 10B and to the other lead 74 of the D.C. source. Upon such momentary energization of solenoid 94, the associated relay switch 94Y is closed to complete a holding circuit for continued energization of solenoid 94 even though the momentary switch 17 is allowed to return to its normally opened position. Such holding circuit extends from one terminal of solenoid 94, through switch 94Y, through contacts 3 of connectors 11A, 11B, through relay switches 62G, 63G, resistance 115, resistance 116 and lead 74 of the D.C. source, the other lead 73A of such D.C. source being connected through contacts 5 of connectors 11B, 11A to the other terminal of solenoid 94. It is observed that this holding circuit thus described includes two resistances 115 and 116 which serve to limit, i.e., reduce the holding current for solenoid 94. It is noted also that means are provided at the microphone, in the form of indicating lamp 18 (FIGURE 2C) to indicate that the apparatus is in a record condition. Such lamp has its opposite terminals connected to contacts 7 and 8 of the connectors 10C, 10B, and such contacts 7 are connected to the junction point of resistances 115 and 116.

It will be observed from the above, that this holding circuit for the solenoid 94 is automatically interrupted upon energization of either the rewind relay 62 or the fast forward relay 63, having the associated relay switches 62G and 63G, respectively. This means that the apparatus is automatically conditioned to listen or playback during and immediately after the initiation of a rewind or fast forward function. Thereafter it is necessary to manually operate the record switch 17 (FIGURE 2C) to initiate another recording function. Further, should there be a power failure, all of the solenoids are deenergized, including solenoid 94, and consequently the holding relay switch 94Y is opened so that, here again, after reapplication of power it is necessary to manually operate the switch 17 before the apparatus is in a record function.

Recording is accomplished while speaking in the microphone 22 with the solenoid 94 in its energized condition. In such case, one terminal of microphone 22 is grounded through contacts 1 of connectors 19 and 20, through contact 12A and the grounded contact ring 12B (FIGURE 2A), the other terminal of microphone 22 being connected through contacts 2 of connectors 19 and 20, through contact 12B, through contact 12A (FIGURE 2A), relay switch 94B, relay switch 94F, and the control grid of tube 101. Such signal is subjected to amplification successively in tubes 101, 105 and 107, and the amplified voltage appearing on the anode of tube 107 is applied to the recording head 90 through condenser 108, relay switch 94P, resistance 117, shunted by condenser 118, resistance 119 and relay switch 94J, it being noted that the other terminal of the recording head 90 is grounded. Also applied to the recording head during this recording function is a relatively small bias current of, for example, 55 kilocycles, developed by the tube 84 which at this time is converted as an oscillator. For this purpose, the control grid of tube 84 is connected through relay switch 94V in a feedback path for sustaining oscillations, such feedback path including such switch 94V, resistance 120, shunted by condenser 122 and the secondary winding 123 of the feedback transformer 124. The primary winding 125 of such transformer tuned by condenser 126 is connected through condenser 127 to the anode of tube 84. A portion of the oscillatory voltage thus developed by tube 84 is applied to the recording head 90 through a path which extends from a terminal on secondary winding 123, condenser 128, condenser 130, relay switch 94J and the ungrounded terminal of recording head 90.

As explained previously, the recording is applied to the tape after initial erasure of the tape and for that purpose erasing currents of relatively large magnitude are applied to the erase head 91, through a path which includes the secondary winding 123, condenser 128, and the ungrounded terminal of erase head 91, it being noted at this time that the short-circuit previously provided by relay switch 94Q no longer exists during the recording function. Instead of recording the input from the microphone 22 as described immediately above, the recording may be in accordance with the output of a so-called F.M. tuner which, in that case, supplies an audio output voltage between the jack contacts 12C and 12B. The contact 12B is grounded while the other contact 12C is connected through relay switch 94N to the ungrounded terminal of the volume control resistance 104 which has its tap connected to the control grid of tube 105 whereby amplification is achieved only in tubes 105 and 107 before the amplified output is applied with the bias current to the recording head 90.

In operation, the apparatus is conveniently converted from the recording function to the listen (playback) function in an easy and simple manner by manipulation of the two switches 16 and 17 carried on the microphone housing 14. These two switches 16 and 17 are mounted close together so that they may both be thumb-operated by the user's hand holding the microphone. Thus, after the power on-off switch 33 (FIGURE 2A) is closed, the solenoid 94 is in an unenergized condition since its holding switch 94Y is at that time open. This means that immediately upon application of power through switch 33 the audio portion of the apparatus is in condition for listening. The tape, however, of course must be moved in order that the prerecorded material may be reproduced. This necessitates manual sliding of the contact bar 16A from its stop position, shown in FIGURE 2C, to its run position wherein the stationary contacts 6 and 7 are bridged. With the switch 16 in its run position, the tape 42 (FIGURE 1) is transported from the rewind reel 44 to the take-up reel past the combination reproducing and recording head 90 which at this time is conditioned for reproduction. The tape in this instance is thus driven due to the pressure roller 52 pressing the tape 42 in frictional engagement with the capstan 40, the capstan 40 being continuously rotated by the drive motor 34. When the switch 16 is returned from its run position to its stop position, the pressure roller 52 is withdrawn and tape movement ceases. Thereafter, in order to again listen to a recording, the switch 16 is returned to its run position.

Oftentimes there may not be any recording on the tape, and in such case no sound reproduction occurs. This lack of sound reproduction might erroneously give the operator the impression that the apparatus is conditioned for recording. In order to avoid mistakes of this character, the apparatus incorporates means whereby a signal may be applied to the microphone, acting as a speaker, or to the speaker 95 itself. Such signal may be in the form of clicks occurring once each four or five seconds and developed by a relaxation oscillator 131 (FIGURE 2A). The use of the relaxation oscillator 131 for this purpose is optional, and if the user desires to take advantage of the same, he manipulates the manually operated switches 132 and 133 to their other positions, in which case the switch 133 connects the output of the relaxation oscillator 131 to the control grid of the output tube 84 through condenser 134 and the tap on the tone control resistance 82. Energizing voltage for the relaxation oscillator 131 is applied through resistance 135 and the relay switch 94W. The clicks which may thus appear during the listening function do not appear during the recording function, since at that time the switch 94W is open. Thus, during the listening function, the user not only hears any prerecorded material reproduced through the microphone 22, acting as a speaker at this time, or through speaker 95, but hears also periodically appearing "clicks"; and if he does not wish to hear these "clicks", he actuates the switches 132 and 133 to their positions illustrated in FIGURE 2A. In addition, the user is appraised of the condition of the machine by the lamp 18 (FIGURE 2C) in the microphone, which lamp is illuminated only in the record function, while on the recorder proper lamp 136 indicates the record function.

While the tape is stationary, i.e., the switch 16 in the stop position or when the machine is in its run position, the same may be conditioned for recording, in either case by momentarily closing the record switch 17, in which case the record-listen solenoid 94 is energized and subsequently maintained in such energized condition by its sealing or holding switch 94W. Thereafter it remains in such record position while the switch 16 is operated from its stop position to its run position, or vice versa; but when the switch 16 is operated to either its rewind or its fast forward position, the machine automatically reverts to a listening condition, since upon movement of the switch to the rewind position, the rewind relay 62 is energized causing opening of its relay switch 62G in the holding circuit for the solenoid 94; likewise, when the switch 16 is operated to its fast forward position, the fast forward relay 63 is energized to open its relay switch 63G, also in the holding circuit for the solenoid 94. Further, should there be a power failure or the on-off switch 33 (FIGURE 2A) opened, the machine also automatically reverts to the listening condition.

While the machine is in the record condition, this condition is indicated by the lamp 18 (FIGURE 2C) and also by the neon bulb 136 (FIGURE 2A) which has one of its terminals connected through resistance 138 and condenser 139 to the oscillation transformer 124. Further, the recording level is indicated by the neon bulb 140 which has one of its terminals coupled via condenser 142 and switch 94P and condenser 108 to the anode of the amplifying tube 107.

While recording, the tape 42 is pressed by the pressure roller 52 into engagement with the capstan 40 and the take-up reel 43 is driven by the motor 48 which at this time is energized exclusively with alternating current to assure taking up of any slack in the tape. Further, the motor 50, coupled to the rewind reel 44, is energized with direct current so as to introduce electro-magnetic drag. In other words, the tape driving system involving motors 48 and 50 are energized the same way in both the listen and the record functions.

During either the rewind or fast forward functions, the pressure roller 52 no longer furnishes a driving connection and the reels 43 and 44 rotate, of course, at a much higher speed with alternating current exclusively on motor 48 or 50, as the case may be, and in the absence of any energization of the other motor while reeling or unreeling of the tape occurs.

In order to accomplish the fast forward function, it is necessary for the user to maintain the slidable switch 16A in engagement with the fast forward contact 8 against the action of spring 86; but, as described later, in the rewind position, the slidable contact 16A is maintained in such rewind condition by ball detent means that offers more resistance to movement into rewind than out of rewind and considerably more resistance than is developed between the "run" and "stop" positions.

Assuming that the slidable contact 16A is moved to the fast forward position and then released to allow the contact member 16A to the run position, then in such case, the tape 42 is wound at a relatively high speed on the take-up reel 43, while the switch 16A is in the fast forward position, and upon release of such switch 16A, the tape is decelerated to a standstill with differential braking of the motors 48 and 50, such differential breaking being accomplished by developing a greater amount of electromagnetic braking in motor 50 than in motor 48. After such standstill condition has been achieved and a short time interval thereafter determined by the time constant of the circuit involving condenser 85 and resistance of coil 65 (FIGURE 2B), the tape is again transported in the run condition with the capstan 40 providing the driving force; and, of course, with the machine automatically conditioned for listening. In other words, during the fast forward operation, there is first a rapid movement of tape onto the take-up reel, a gradual slowing down of the tape, a short interval during which both reels are stationary and then a slower movement of the tape in a run condition (assuming that the switch 16A is returned from its fast forward condition to its run condition).

In the rewind operation there is a similar course of events with, of course, opposite movement of the tape, but also there is a pause in reel movement before the tape begins to move in the run condition (assuming that switch contact 16A is moved directly from its rewind position to its run position). In this latter instance, the pause or time delay is determined by the time constant of the circuit involving condenser 87, resistance 89 and the resistance of coil 66 (FIGURE 2B).

Provisions are incorporated for running the tape 42 at different uniform speeds in the run condition; and this involves running the belt 38 (FIGURE 1) over different diameter portions of the pulley 35. This is desirable since in some instances it is preferred to make certain recordings at slow tape speed and to make other recordings at high tape speed. Accordingly, it is desirable to provide equalization in the amplifier system shown in FIGURE 2A and for that purpose switches 143 and 144 are provided. The general function of these switches 143 and 144 and their connected circuit elements is to provide proper equalization to compensate for the different recording characteristics of the tape at different speeds. For that purpose, switch 143 serves to connect resistance 145 in shunt with resistance 146 and switch 144 serves to connect condenser 148 in shunt with condenser 150, it being noted that one terminal of condenser 150 is grounded and the other terminal is connected through the peaking coil 152 and resistance 153 through the cathode of tube 107, the junction point of elements 152 and 153 being connected through relay switch 94S to ground so that in the listen position this compensating circuit is shorted to ground. On the other hand, the compensating circuit involving elements 145 and 146 are effective during the listening function since the ungrounded terminal of the same is coupled via condenser 160 and switch 94M to the ungrounded terminal of the volume control resistance 104.

FIGURES 4 and 5 illustrate constructional features of the switch 16. The shorting bar 16A is mounted by machine bolt 16B in a recessed underside portion of the slidable actuator 16C of insulating material, such actuator having a knurled extension 16D for convenient thumb operation and being guided in its movement by spaced walls which define a rectangular opening 16E in the cylindrical housing 14.

For purposes of indexing the actuator 16D and to assure return of the actuator 16D from its fast forward position, a spring pressed ball 16F is recessed in a bore in the actuator and biased in an outwardly direction by the coil compression spring 16G. This ball 16F is shown in the various positions it assumes in FIGURE 5 wherein the four positions are indicated, namely, "rewind," "stop," "run" and "fast forward." For this purpose electrically inactive contacts 2, 3 and 4 of the switch are used. It is noted that contact 3 has a relatively small height and hence a relatively small resistance is imposed in movement of the actuator 16D from run to stop and vice versa. However, as seen in FIGURE 5, the contact 2 is relatively high and a greater amount of force is required to move the ball 16F over the contact 2 against the action of spring 16G in movement of the actuator 16D from rewind to stop and vice versa. In the rewind position, movement of the actuator to the left in FIGURE 4 is limited by engagement of the actuator 16C, D with stationary wall 16H. In the fast forward position, the contact bar 16A engages the raised electrically active contact 8 and in such position the ball 16F is on a curved portion of the electrically inactive contact 4 so that upon manual release of the actuator, it is automatically returned from such fast forward position to the run position due to the cam action between the spring pressed ball 16F with contact 4.

Figure 6:
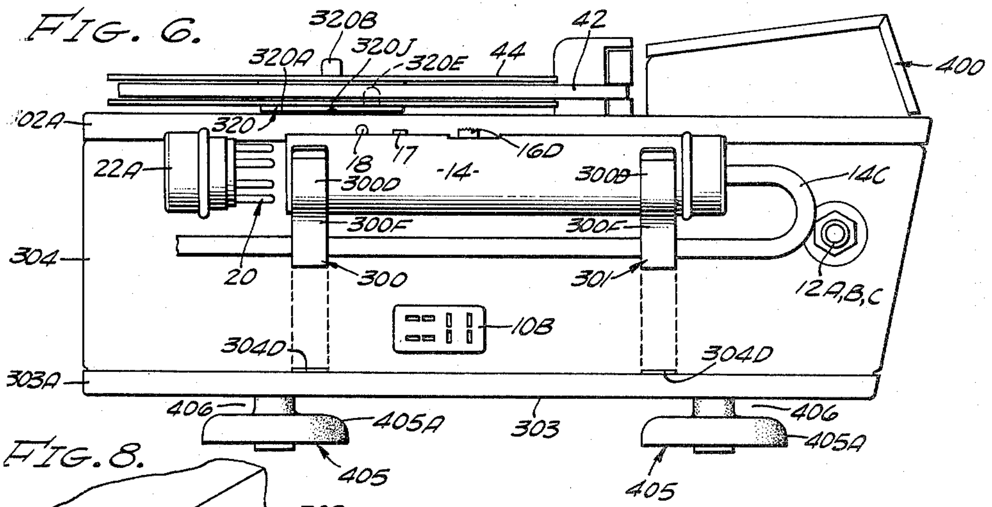
FIGURE 6 is a side view of the recorder.
Figures 7, 8, 9, 10, 11, 12:
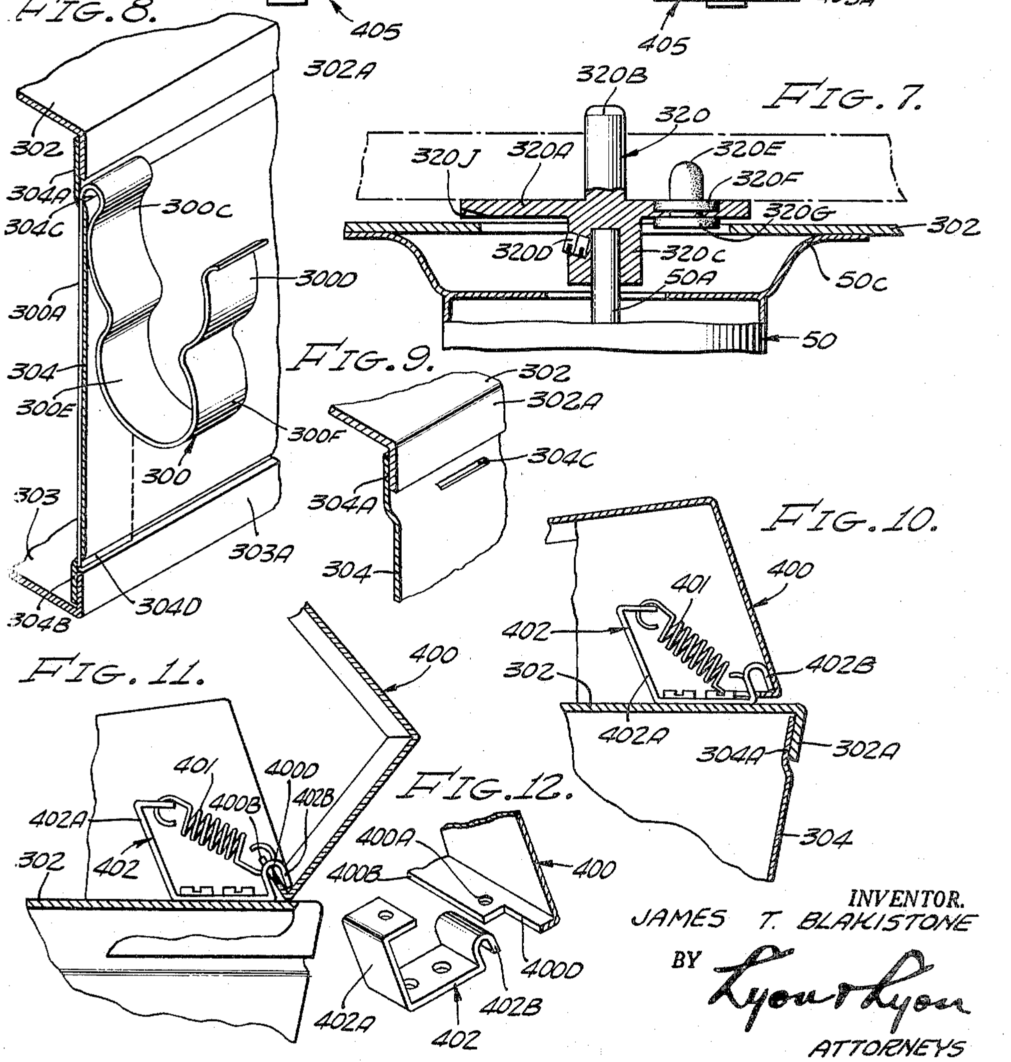
FIGURE 7 shows details of a tape reel spool.
FIGURES 8 and 9 show details of the microphone support.
FIGURES 10, 11 and 12 show details of a hinge structure.

The microphone and control casing 14 with its interconnecting cable 14C is releasably secured in a pair of spaced clips 300 and 301, each of identical construction as shown in connection with FIGURES 6, 8 and 9. A feature of this construction is that such clips, if desired, may be removed without impairing the appearance of the recorder. In this construction the upper housing plate 302 and lower housing plate 303 in the form of pans and a generally rectangularly bent metal sheet 304, perforated or not, provide an enclosure. The opposite edges of such rectangular sheet 304 are bent inwardly at 304A and 304B to define generally L-shaped cross-sectional portions which engage the inner surface of inwardly extending lips 302A, 303A of the generally rectangular pan-shaped closure plates 302, 303. The metal sheet 304 has a rectangular slit 304C (FIGURE 9) located close to the outer edge of lip 302A to receive a corresponding one of the clips 300, 301 which is formed in the shape shown from thin metallic strip material. It is noted that the clip 300 comprises a straight portion 300A which engages and is concealed by the closure member 304 and which has its lower end passing through a slightly oversized rectangular aperture portion 304D and is sandwiched between elements 304B and 303A to thereby secure the lower end of such clip. The clip extends also through the slightly oversized aperture portion 304C and has its exposed free end bent in a generally U-shaped configuration with, however, spaced upper bowed portions 300C, 300D and spaced lower bowed portions 300E, 300F. The upper bowed portions 300C, 300D provide a resilient receptacle for the cylindrical housing 14 to allow the housing 14 to be resiliently retained in transportation of the machine while yet allowing the housing 14 to be conveniently removed from such receptacle for, for example, dictation purposes. The lower spaced bowed portions 300E, 300F define a convenient storage space through which one or more loops of the microphone cable 14C may extend for storage and retention purposes. Also, as shown in FIG- URE 6, the housing 22A containing the microphone 22, terminates in an octal plug 20 and cooperates with a recessed socket 19 (FIGURE 2C) in the housing 14. By this plug and socket arrangement the microphone and its housing 22A may be removed to render the machine foolproof in the sense that inadvertent or accidental erasure of pre-recorded material may be prevented by simply removing the housing 22A. Upon such removal, it is observed that the contacts 3, 4 of connectors 19, 20 (FIGURE 2C) are no longer interconnected, thereby disabling the record circuit which includes record switch 17. In other words, when plug 20 is detached from its conventional octal type socket, operation of record switch 17 is without effect, i.e., the recording function is disabled.

It will be clear from the above that the machine may be used for dictation purposes as well as for high-fidelity recording of program material and its playback. When used for dictation purposes, a stenographer may use the machine for transcription; and in such case, the control plug 10C (FIGURE 2C) at one end of the microphone cable 14C is removed from its socket 10B (FIGURE 3 and 6) and the stenographer plugs in the plug 10S to which is connected her control apparatus shown in FIGURE 3A. Such control apparatus includes the two foot-operated switches 10G and 10H. Operation of switch 10G to its first position converts the machine from its stop function to its run function and further foot pressure converts the machine from its run function to its fast forward function. Operation of the other switch 10H converts the machine from its stop function to its rewind function.

For this purpose, switch 10G is a conventional pressure sensitive switch which includes contacts 1, 2 and 3 connected respectively to pins 8, 3 and 6 of the plug. Contacts 1 and 2 are first closed and then increased pressure necessary to overcome the action of spring 10J results in engagement of contacts 2 and 3 so that in the first stage of operation, as outline above, the machine goes from its stop function to its run function and then from its run function to its fast forward function. Switch 10H, also foot-operated, has its contacts connected to pins 3 and 8 of plug 10S so that when switch 10H is operated the machine goes into rewind. It is observed that the transcriber is unable to initiate an erase or recording function. However, if it is desired to erase the material after transcription, a so-called erase plug in the form of a Jones plug 10M (FIGURE 3B) may be inserted in the Jones socket 10B (FIGURES 1 and 6). Plug 10M has its pins 8 and 4 interconnected to initiate the run function and its pins 8 and 5 interconnected to initiate the erase function. These connections are made by short jumpers in the Jones plug 10M and are not normally visible.

The tape reel spool 320 shown in FIGURE 7 allows the use of inexpensive squirrel cage type of induction motors and its construction obivates other problems.

The tape reel spol 320 shown in FIGURE 7 allows the use of inexpensive squirrel cage type of induction motors and its construction obviates other problems. The spool 320 comprises a metal disc portion 320A, a center post 320B, a sleeve portion 320C, a retaining screw 320D for retaining the spool on the motor shaft 50A, and an offset rubber post 320E which is self-retained by its two spaced disc shaped flanges 320F, 320G on a circular apertured portion in the disc portion 320A. This rubber post enters a conventional opening in a tape reel threaded over both posts 320B and 320E to provide a driving connection between the motor driven spool and reel thereon. Using such a rubber post 320E, its resiliency serves to smooth out slight fluctuations in rotational speeds occasioned by the nature of the inexpensive driving motor which produces a cogging effect. Without such an arrangement, expensive motors of, for example, the so-called hysteresis type, would have to be used to obtain the resulting uniform rotational speeds of the reel.

Further, the motor 50 in FIGURE 7 may be mounted on the underside of the top plate or deck 302, using its bell-shaped mounting flange 50C of metal for that purpose in heat conducting relationship to the top deck 302 of metal for heat dissipation purposes so as to allow the use of a small motor. By using such flange, however, difficulties are introduced in affixing the spool 320 to the shaft, particularly when it is desired, as is the case here, to minimize the annular clearance space 340 between the spool and the top deck 302. A small clearance space is preferred since otherwise there is a possibility that the standard ¼" tape, after spilling from a reel, may become jammed and damaged in the space between the spool and the top deck 302.

Taking all of the factors in account, the manner of affixing the spool 320 on the motor shaft 50A is considered to be important. This involves placement of the axis of the Allen head screw at an angle in the sleeve portion 320C and providing a notched portion 320J in the periphery and on the underside of the disc portion 320A to allow insertion of an Allen head wrench for tightening and loosening of the screw 320D, as the case may be, in assembly, clearance adjustment and repair.

The machine is provided with a top cover plate 400 which is hinged by a novel inexpensive hinge structure shown in FIGURES 10–12. Such hinge structure involves a tension spring 401, a special bracket 402 secured to the top deck 302 and the cover 400. The bracket 402 has a relatively long arm portion 402A to which is attached one end of spring 401, the other end of spring 401 being looped through an apertured portion 400A in the cover member so that such spring 401 constantly, and in all positions of the cover member, causes the lower inturned end 400A of the cover to frictionally engage the downturned end 402B of bracket 402 and out of engagement with the top deck to thereby prevent scratching or wear of the top deck in opening and closing of the lid 400. It is understood that there are two such hinges provided preferably near the ends of the cover. It will be observed from the drawings that the spring 401 retains the cover 400 in a stable position either while open as shown in FIGURE 11 or closed as shown in FIGURE 10. This is partly due to the fact that the axis of the spring 401 extends above the pivot point defined by the contacting surfaces of the bracket and cover in the open position in FIGURE 11, and such axis extends below such pivot point in the closed position shown in FIGURE 10. Further, the weight of the cover, the friction developed at the contact point and the fact that the bracket extends into an inner corner of the cover, aid in assuring that the cover or lid will remain in an open or closed position, as the case may be. Further, the cover may be easily assembled or removed while in open position by placing the cover in position and then attaching or detaching the spring 401, as the case may be. It will also be observed with reference to FIGURE 12 that the lower lip 400B of the cover is provided with a rectangular notched portion 400D so that the unnotched portion of the lip 400B provides a substantially full closure member in the closed position without, however, at any time engaging the top deck 302.

The recorder is supported on a flat surface such as a table on four feet 405, each of identical construction and spaced on the corners of a rectangle. These feet are secured to the bottom plate 303, and are of rubber. These feet are of special construction and each includes a flanged portion 405A spaced from the bottom plate 303 to provide a space 406 therebetween for storing the alternating current line cord to the apparatus. The cord is, of course, a conventional two conductor cord or cable. Such cord is wrapped around the legs 405 in the spaces 406 in the rectangular pattern defined by the four spaced legs. By this expedient the line cord is stored underneath the bottom plate 303 and does not dangle from the apparatus when thus stored substantially out of sight for shipping and other purposes.

I claim:

1. A recording system of the character described, recording media transport means, a single four-position switch having only a stop position, a run position, a rewind position and a fast forward position, means effective when said switch is in a stop position for rendering said transport means ineffective, means effective when said switch is in its run position for operating said transport means so that the recording media transported thereby moves in a forward direction at a relatively slow speed for recording and reproduction purposes, means effective when said switch is in its fast forward position for operating said transport means so that the recording media transported thereby moves in said forward direction at a relatively fast speed, means effective when said switch is in its rewind position for operating said transport means so that the recording media transported thereby is transported at a relatively high speed in a backward direction, a second manually operable switch, means normally effective to reproduce a recording when the first mentioned switch is in its run position, means operated upon operation of said second switch for disabling the last mentioned means and for producing a recording on the recording media, and means effective after said operation of said second switch for preventing operation of said last mentioned means when said first switch is moved between its run and off positions.

2. A recording system as set forth in claim 1, including a microphone housing, said first switch and second switch being mounted on said microphone housing, said microphone housing including a subhousing which houses the microphone, means for quickly attaching and detaching said subhousing from said housing, and said recording means including means whereby said recording means is rendered ineffective when said subhousing is detached from said housing.

3. In a system of the character described, means for rewinding a recording media, means for moving said recording media in a fast forward condition, third means for transporting the recording media in a forward direction at a relatively slow speed, a single switch, each of said means being controlled by said single switch having a corresponding rewind position, fast forward position and a run position, said switch being effective to operate said rewind means when in its rewind position, said switch being effective to operate said fast forward means in its fast forward position, said switch being effective to operate the third mentioned means when it is in its run position, means including time delay means effective to prevent operation of the third mentioned means after said switch is returned to its run position either from its fast forward position or from its rewind position.

4. In a system of the character described, a tape transport system, said transport system comprising three motors, means energizing one of said motors continuously for imparting a constant speed to the recording media during the recording or playback functions, a second of said three motors comprising a leading alternating current type motor, means energizing said leading motor with alternating current during the recording or playback functions with a reduced alternating current voltage and for energizing said leading motor with a relatively high voltage during the fast forward function, means energizing said leading motor with a relatively low D.C. stabilizing voltage during the stop function, means energizing said leading motor with a relatively large D.C. braking voltage of relatively short duration for braking the same immediately following the termination of the high speed rewind function and for a period only slightly longer than that required to stop the recording media, said leading motor being de-energized during the rewind function, means applying to said leading motor a reduced D.C. stabilizing voltage during the braking period following the termination of the fast forward function, the third motor comprising a rewind motor energized during the rewind function with a relatively large A.C. voltage and with a relatively small D.C. voltage during the stop function and with a slightly small D.C. voltage during the run function, means applied to said rewind motor during the braking period following the termination of the fast forward function a timed heavy D.C. voltage of a duration almost equal to or longer than that required for the recording media to stop, a pressure roller for establishing a driving connection between the first motor and the recording media, means rendering said pressure roller ineffective when either said second or third motors is energized with said relatively large D.C. voltages.

5. In a system of the character described, means for rewinding a recording media, means for moving said recording media in a fast forward condition, third means for transporting the recording media in a forward direction at a relatively slow speed, a rewind switch, a fast forward switch, a run switch, each of said means being controlled correspondingly by said rewind switch, fast forward switch and said run switch, said switch being effective to operate said rewind means when said rewind switch is operated, said fast forward switch being effective to operate said fast forward means in its fast forward position, said run switch being effective to operate the third mentioned means after it is in its run position, means including time delay means effective to prevent operation of the third mentioned means when said run switch is returned to its run position.

6. A recording system of the character described, recording media, transport means comprising a take-up motor, a four-position switch having a stop position, a run position, a rewind position and a fast forward position, a rewind motor, said take-up motor and said rewind motor each having a shaft, a source of alternating current for driving said motors, a source of direct current for braking said motors, means for energizing said motors from a direct current source to stabilize the shafts of said motors, means effective when said switch is in a stop position for rendering said transport means ineffective and for energizing said motors from said direct current source, means effective when said switch is in its run position for operating said transport means so that the recording media transported thereby moves in a forward direction at a relatively slow speed for recording and reproduction purposes, means effective when said switch is in its fast-forward position for operating said transport means so that the recording media transported thereby moves in said fast-forward direction at a relatively fast speed, means effective when said switch is in its rewind position for operating said rewind motor so that the recording media transported thereby is transported at a relatively high speed in a backward direction, and means effective to energize one of said motors from said alternating current source and to energize the other one of said motors from said direct current source.

7. In a reversible reeling system, first means for driving the system in one direction at a given speed, second means for driving the system in the opposite direction, multiposition control means, means for energizing said second driving means in response to said control means assuming a first position, means for energizing said first driving means in response to said control means assuming a second position, means for energizing both said first and second drive means in such a manner as to drive said system in said one direction at a speed less than said given speed when said control switch assumes a third position, means for selecting said first driving means for energization when said selecting means assumes a first condition, said selecting means having a second condition for selecting said second driving means for energization, means for energizing the selected driving means so as to cause it to operate as a brake upon the system when said control means assumes a fourth position, and means for causing said selecting means to assume said first condition in response to the moving of said control means from said first to said second position, said latter means being responsive to the moving of said control means from said second to said first position for causing said selective means to assume said second condition.

8. In a reversible reeling system, first means for driving the system in one direction at a given speed, second means for driving the system in the opposite direction, multiposition control means, means for energizing said second driving means in response to said control means assuming a first position, means for energizing said first driving means in response to said control means assuming a second position, means for energizing both said first and second drive means in such a manner as to drive said system in said one direction at a speed less than said given speed when said control switch assumes a third position, means for selecting said first driving means for energization when said selecting means assumes a first condition, said selecting means having a second condition for selecting said second driving means for energization, means for energizing the selected driving means so as to cause it to operate as a brake upon the system when said control means assumes a fourth position, and means for causing said selecting means to assume said first condition in response to the moving of said control means from said first to said second position, said latter means being responsive to the moving of said control means from said second to said first position for causing said selective means to assume said second condition, said fourth position being a position through which said control means must pass during each change of position between its first and second positions whereby said first and second driving means are selectively energized to operate as braking devices during each change in the direction of movement of said system.

9. The combination of claim 7 in which said first and second driving means includes first and second motors, said means for energizing said first and second motors includes a source of voltage which is respectively applied to said first and second motors when said control means assumes said second and first positions.

References Cited by the Examiner

UNITED STATES PATENTS

| | | | |
|---|---|---|---|
| 1,587,430 | 6/1926 | Seiz | 318—212 |
| 1,997,464 | 4/1935 | Krebs | 318—212 |
| 2,535,486 | 12/1950 | Dank | 242—55.12 X |
| 2,536,666 | 1/1951 | Somers | 179—100.1 |
| 2,664,251 | 12/1953 | Berlant | 242—55.12 |
| 2,698,882 | 1/1955 | Payne | 179—100.2 |
| 2,704,639 | 3/1955 | Shields | 242—55.12 |
| 2,719,884 | 10/1955 | Reed et al. | 179—100.2 |
| 2,736,192 | 3/1956 | Weide | 200—5 |
| 2,741,439 | 4/1956 | Dale et al. | 242—55.12 |
| 2,751,438 | 6/1956 | Baer | 179—100.2 |
| 2,761,923 | 9/1956 | Kishbaugh et al. | 200—5 |
| 2,775,407 | 12/1956 | Elliott et al. | 242—55.12 |
| 2,783,951 | 3/1957 | Munroe | 242—55.12 |
| 2,813,686 | 11/1957 | Schroter | 242—55.12 |
| 2,864,894 | 12/1958 | Dale | 179—100.2 |
| 2,923,488 | 2/1960 | Gratian et al. | 242—55.12 |
| 3,051,795 | 8/1962 | Roberts et al. | 179—100.1 |
| 3,061,688 | 10/1962 | Brown et al. | 179—100.1 |

MERVIN STEIN, *Primary Examiner.*

ROBERT H. ROSE, L. MILLER ANDRUS, JOSEPH P. STRIZAK, *Examiners.*